(12) United States Patent
Chen et al.

(10) Patent No.: US 9,497,452 B2
(45) Date of Patent: Nov. 15, 2016

(54) SYSTEM AND METHOD OF TRANSMISSION AND RECEPTION OF VIDEO USING COMPRESSED DIFFERENTIAL TIME STAMPS

(75) Inventors: Sherman (Xuemin) Chen, San Diego, CA (US); Alexander G. MacInnis, Los Altos, CA (US)

(73) Assignee: BROADCOM CORPORATION, Irvine, CA (US)

( * ) Notice: Subject to any disclaimer, the term of this patent is extended or adjusted under 35 U.S.C. 154(b) by 2299 days.

(21) Appl. No.: 10/349,705

(22) Filed: Jan. 22, 2003

(65) Prior Publication Data

US 2003/0138051 A1 Jul. 24, 2003

Related U.S. Application Data

(60) Provisional application No. 60/351,182, filed on Jan. 22, 2002, provisional application No. 60/384,234, filed on May 30, 2002, provisional application No. 60/441,072, filed on Jan. 17, 2003.

(51) Int. Cl.
| | |
|---|---|
| *H04N 19/00* | (2014.01) |
| *H04N 21/2343* | (2011.01) |
| *H04N 21/236* | (2011.01) |
| *H04N 21/43* | (2011.01) |
| *H04N 7/01* | (2006.01) |

(52) U.S. Cl.
CPC ........ *H04N 19/00* (2013.01); *H04N 21/23608* (2013.01); *H04N 21/234318* (2013.01); *H04N 21/4307* (2013.01); *H04N 7/012* (2013.01)

(58) Field of Classification Search
CPC .. H04N 19/00; H04N 7/012; H04N 21/4307; H04N 21/234318; H04N 21/23608
USPC ........... 375/240.26, 240.25, 240.21, 240.16, 375/240.12, 240.27, 240.28, 240.09; 370/509, 474; 386/52
IPC ........................................ H04B 1/66
See application file for complete search history.

(56) References Cited

U.S. PATENT DOCUMENTS

| | | | |
|---|---|---|---|
| 5,168,356 A | | 12/1992 | Acampora et al. |
| 5,461,420 A | | 10/1995 | Yonemitsu et al. |
| 5,517,250 A | * | 5/1996 | Hoogenboom et al. . 375/240.27 |
| 5,565,923 A | * | 10/1996 | Zdepski .................. 375/240.26 |
| 5,594,660 A | * | 1/1997 | Sung et al. .................... 715/203 |

(Continued)

FOREIGN PATENT DOCUMENTS

| | | |
|---|---|---|
| EP | 1182889 | 2/2002 |
| EP | 1603340 | 12/2005 |

(Continued)

OTHER PUBLICATIONS

International Search Report, International Application No. PCT/US03/01980, Jun. 13, 2003.

*Primary Examiner* — Tung Vo
(74) *Attorney, Agent, or Firm* — Foley & Lardner LLP; Christopher J. McKenna; Paul M. H. Pua (57) ABSTRACT

Systems and methods that use differential values to represent decoding and presentation times of pictures are provided. Optionally, some of the systems or the methods may use an entropy coding method such as, for example, the Universal Variable Length Code (UVLC) for the differential time stamps.

35 Claims, 4 Drawing Sheets

(56) References Cited

U.S. PATENT DOCUMENTS

| | | | |
|---|---|---|---|
| 5,717,461 A * | 2/1998 | Hoogenboom | 375/240.25 |
| 5,771,075 A * | 6/1998 | Rim et al. | 348/512 |
| 5,801,781 A * | 9/1998 | Hiroshima et al. | 348/441 |
| 5,960,006 A * | 9/1999 | Maturi et al. | 370/509 |
| 6,011,869 A * | 1/2000 | Ohta et al. | 382/233 |
| 6,081,299 A * | 6/2000 | Kesselring | 348/512 |
| 6,101,195 A * | 8/2000 | Lyons et al. | 370/498 |
| 6,115,070 A | 9/2000 | Song et al. | |
| 6,429,902 B1 * | 8/2002 | Har-Chen et al. | 348/518 |
| 6,493,392 B1 | 12/2002 | Moon et al. | |
| 6,542,549 B1 * | 4/2003 | Tan et al. | 375/240.26 |
| 6,678,332 B1 * | 1/2004 | Faibish et al. | 375/240.26 |
| 6,748,020 B1 * | 6/2004 | Eifrig et al. | 375/240.26 |
| 6,779,198 B1 * | 8/2004 | Morinaga et al. | 725/134 |
| 6,829,304 B1 * | 12/2004 | Cole | 375/240.26 |
| 6,876,670 B1 * | 4/2005 | Budrikis et al. | 370/474 |
| 6,906,755 B2 * | 6/2005 | Lundblad et al. | 348/515 |
| 6,907,081 B2 * | 6/2005 | Mantchala et al. | 375/240.26 |
| 6,993,081 B1 * | 1/2006 | Brunheroto et al. | 375/240.28 |
| 7,068,719 B2 * | 6/2006 | Liu et al. | 375/240.12 |
| 7,174,560 B1 * | 2/2007 | Crinon | 725/60 |
| 7,362,838 B2 * | 4/2008 | Mizukami et al. | 375/362 |
| 7,647,619 B2 * | 1/2010 | Kashima | 725/146 |
| 2001/0028404 A1 | 10/2001 | Fukuhara et al. | |
| 2001/0036355 A1 * | 11/2001 | Kelly et al. | 386/52 |
| 2001/0047517 A1 | 11/2001 | Christopoulos et al. | |
| 2002/0001345 A1 | 1/2002 | Yamada et al. | |
| 2002/0087999 A1 * | 7/2002 | Kashima | 725/100 |
| 2002/0196850 A1 * | 12/2002 | Liu et al. | 375/240.12 |
| 2003/0016622 A1 | 1/2003 | McCarty, Jr. | |
| 2003/0048208 A1 | 3/2003 | Karczewicz | |
| 2003/0081850 A1 | 5/2003 | Karczewicz et al. | |
| 2004/0012510 A1 * | 1/2004 | Chen | 341/50 |
| 2006/0088063 A1 * | 4/2006 | Hartung et al. | 370/498 |

FOREIGN PATENT DOCUMENTS

| | | |
|---|---|---|
| JP | 2002-16500 * | 1/2002 |
| WO | 02/100110 | 12/2002 |

* cited by examiner

SYSTEM AND METHOD OF TRANSMISSION AND RECEPTION OF VIDEO USING COMPRESSED DIFFERENTIAL TIME STAMPS

RELATED APPLICATIONS

This application makes reference to, claims priority to and claims benefit from U.S. Provisional Patent Application Ser. No. 60/351,182, entitled "Method for Enabling Transmission and Display of Encoded Compressed Film Material in a Video Bit Stream" and filed on Jan. 22, 2002; U.S. Provisional Patent Application Ser. No. 60/384,234, entitled "Method for Enabling Transmission and Display of Encoded Compressed Film Material in a Video Bitstream" and filed on May 30, 2002; and U.S. Provisional Patent Application Ser. No. 60/441,072, entitled "Method for Enabling Transmission and Display of Encoded Compressed Film Material in a Video Bit Stream" and filed on Jan. 17, 2003.

INCORPORATION BY REFERENCE

The above-identified United States patent applications are hereby incorporated herein by reference in their entirety.

BACKGROUND OF THE INVENTION

For most applications, digital video is displayed at a known frame rate or at a known field rate. For example, in countries that use 525-line interlaced display systems such as, for example, the United States and Canada, television video signals are sampled and transmitted at approximately 59.94 fields per second (fps). For such countries, digital television video streams are generally encoded and transmitted by using a particular Moving Pictures Experts Group (MPEG) standard (e.g., MPEG-2 Video) at approximately 29.97 frames per second (FPS).

Hereinafter, an integral value of fps or an integral value of FPS may be an approximation including, within its scope, a range of equivalent values. Thus, for example, the expression 30 FPS may be used to refer to rates such as, for example, approximately 29.97 FPS or approximately 30 FPS. Furthermore, the expression 24 FPS may be used to refer to rates such as, for example, approximately 23.976 FPS or approximately 24 FPS. Similarly, the expression 60 fps may be used to refer to rates such as, for example, approximately 59.94 fps or approximately 60 fps.

A given frame rate implies a fixed inter-picture display time interval. Therefore, the frame rate can be used to derive the decoding and presentation times for some or all of the pictures in a video sequence.

In the MPEG-1 Systems and MPEG-2 Systems standards, there are syntax elements such as, for example, a decoding time stamp (DTS) and a presentation time stamp (PTS) which specify the decoding time and presentation time, respectively, of some pictures in terms of a Hypothetical Reference Decoder model called a System Target Decoder (STD). The decoding time refers to the time that a compressed picture is removed from a buffer in the STD model. This is not necessarily the exact time that a practical decoder decodes the picture. The presentation time in the STD model is the time a picture is presented. This may be taken to mean the display time in a real decoder, although practical decoders may display pictures at slightly different times than those indicated by the video stream. The MPEG-2 Video standard (i.e., ISO/IEC 13818-2) specifies a VBV delay syntax element that indicates similar information to that contained in the DTS in the Hypothetical Video Decoder model and represents the delay from the time certain compressed data enters a buffer in the model to the time a given picture is extracted from that buffer in the model. In the MPEG-1 and MPEG-2 standards, the DTS, PTS and VBV_delay syntax elements specify times in units of a 90 kHz reference clock. The principle of providing decoding and presentation times can apply to any video coding and decoding standard regardless of the syntax specification and the units of time reference. Hereinafter, the terms presentation time and display time are to be used interchangeably, and the terms decoding time and buffer removal time are to be used interchangeably.

However, for some video applications, the intervals between successive pictures may not be a constant or fixed. It may be desirable for a video coding standard to support dynamically variable frame rates or different types and durations of pictures interspersed to form a video sequence. Thus, variable inter-picture decoding and display times need to be supported. Inter-picture display time can no longer be represented properly by a frame rate. It may be considered necessary to encode the presentation times of all pictures, which is not necessary in MPEG-2 due to the use in MPEG-2 of constant frame rates. The inclusion of a presentation time stamp such as PTS for every picture or the inclusion of a decoding time stamp such as DTS for every picture is undesirable because of the number of bits (e.g., 33 bits per time stamp) and the syntax layers used for encoding in the MPEG-2 standard. Thus, conventional systems and methods may lack an efficient method to represent and to encode presentation times with either fixed or variable inter-picture display intervals.

The inter-picture decoding interval is, in general, not the same as the inter-picture display interval. For example, in MPEG-2 Video while the frame rate is constant for a given sequence, the interval between the decoding times of successive pictures, represented by DTS or by the VBV_delay field, may vary independently every picture. However, in MPEG-1 and MPEG-2, the decoding time is specified with reference to a time that specific data elements enter a buffer in a Hypothetical model, which requires precise specifications of when each data element enters the Hypothetical buffer. Precise specifications may not be available in all cases. Precise specifications also tend to lead to large syntax elements to specify the decoding time and complexity in specifying and interpreting the DTS and VBV_delay values.

Further limitations and disadvantages of conventional and traditional approaches will become apparent to one of ordinary skill in the art through comparison of such systems with some aspects of the present invention as set forth in the remainder of the present application with reference to the drawings.

BRIEF SUMMARY OF THE INVENTION

Some aspects of the present invention may be found in, for example, systems and methods that use differential values to represent decoding and presentation times of pictures and that, optionally, use an entropy coding method such as, for example, a Universal Variable Length Code (UVLC), for the differential time stamps.

In one embodiment, the present invention may provide that a display time of a picture may be represented as the difference between the presentation times of the picture and the presentation times of an adjacent picture in display order.

The differential time values may be coded by using entropy coding (e.g., UVLC) or by using other methods such as, for example, fixed length codes.

In another embodiment, the present invention may provide that a decoding time of a picture may be represented by the difference between the decoding times of the picture and the decoding times of an adjacent picture in coded data order. The differential decoding times may be encoded by the use of entropy coding (e.g., UVLC) or by using other methods such as, for example, fixed length codes.

These and other features and advantages of the present invention may be appreciated from a review of the following detailed description of the present invention, along with the accompanying figures in which like reference numerals refer to like parts throughout.

DETAILED DESCRIPTION OF THE INVENTION

Some embodiments according to the present invention provide an efficient and flexible method to represent and to encode decoding times or presentation times using either fixed intervals or variable intervals between pictures. Some embodiments according to the present invention may be suitable for use in or compatible with new video compression standards (e.g., MPEG-4 AVC standard as described in, for example, document JVT-E146d37ncm.doc, entitled "Joint Video Specification (ITU-T Rec. H.264 |ISO/IEC 14496-10 AVC)", incorporated herein by reference in its entirety) as well as existing video transport standards (e.g., MPEG-2 Systems, IETF RTP, etc.) The MPEG-2 Systems standard may also be known as ISO/IEC 13818-1, and the MPEG-2 Video standard may also be known as ISO/IEC 13818-2; both of which are incorporated by reference herein in their entirety.

Some embodiments according to the present invention may relate to a system or a method that uses differential values to represent picture display times or presentation times and to represent picture decoding times or buffer removal times. Optionally, some embodiments may provide for the use of entropy coding such as, for example, Universal Variable Length Code (UVLC) for the differential time values. UVLC may also be known as exp-golomb coding. One embodiment of UVLC, referred to as exp-golomb codes, is described in the MPEG-AVC draft standard previously reference. However, it is understood that the present invention also contemplates using other embodiments of UVLC. Some embodiments according to the present invention may be suitable for use in or compatible with some MPEG standards (e.g., MPEG-4 AVC).

Some embodiments according to the present invention may relate to a system or a method that uses differential values to represent picture presentation times or picture decoding times. Optionally, some embodiments may include, for example, the use of an entropy coding method such as, for example, UVLC to compress the differential time interval values. Some embodiments may be suitable for use in or compatible with some MPEG standards (e.g., MPEG-4 AVC).

Figure 1:
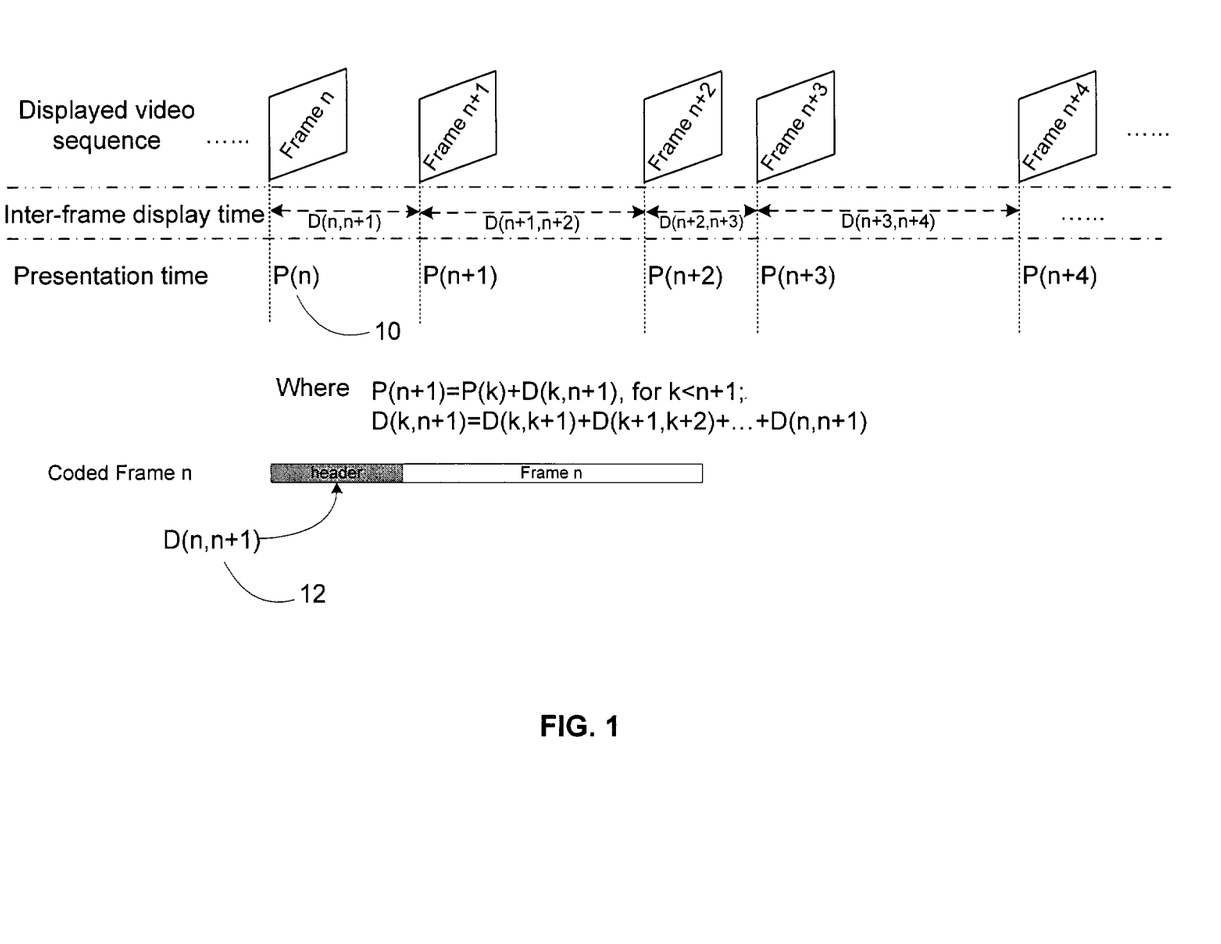
FIG. 1 shows an embodiment of a video sequence according to the present invention.

In one embodiment, the present invention may provide that presentation times of pictures may be represented as differences between the presentation times of two adjacent pictures in presentation order. An embodiment of a video sequence illustrating differentially represented presentation times according to the present invention is shown in FIG. 1. Although inter-picture display time intervals are illustrated as variable, the present invention may be applied to variable time intervals as well as to constant time intervals between frames, pictures or packets.

In presentation order, the presentation time of the (n+1)-th picture may be generated by using, for example, the presentation time 10 of the n-th picture and the inter-picture presentation interval or time difference 12 between the n-th picture and the (n+1)-th picture. In one embodiment, the presentation time of the (n+1)-th picture may be determined by adding the presentation time 10 of the n-th picture to the inter-picture interval or time difference 12 of the n-th picture. The presentation time of the n-th picture may be encoded by a variety of means such as, for example, via an implied time at the start of a sequence of pictures or a non-differential encoding of the presentation time of the n-th picture. An example of a non-differential coding of presentation time is the PTS specification in the MPEG-2 Systems standard (i.e., ISO/IEC 13818-1). The coded presentation difference time may be included, for example, in the syntax of the picture to which it refers, for example, in the picture header or in other sections of the syntax of the video data such as, for example, in packets that include the compressed video data or in data structures that refer to the picture.

In another embodiment, the present invention may provide that decoding times of pictures may be represented by differences between the decoding times of two adjacent pictures in coded data order.

In decoding order, the decoding time of the (m+1)-th picture may be generated by using, for example, the decoding time of the m-th picture and the inter-picture decoding interval or time difference. In one embodiment, the decoding time of the (m+1)-th picture may be determined by adding the decoding time of the m-th picture to the inter-picture decoding interval or time difference between the m-th picture and the (m+1)-th picture. The decoding time of the m-th picture may be encoded by a variety of means such as, for example, via an implied time at the start of a sequence of pictures or a non-differential encoding of the decoding time of the m-th picture. An example of a non-differential coding of decoding time is the DTS specification in the MPEG-2 Systems standard. Another example is the VBV_delay specification in the MPEG-2 Video standard. The coded decoding difference time may be included, for example, in the syntax of the picture to which it refers, for example, in the picture header or in other sections of the syntax of the video data such as, for example, in packets that include compressed video data or in data structures that refer to the picture.

Figure 2:
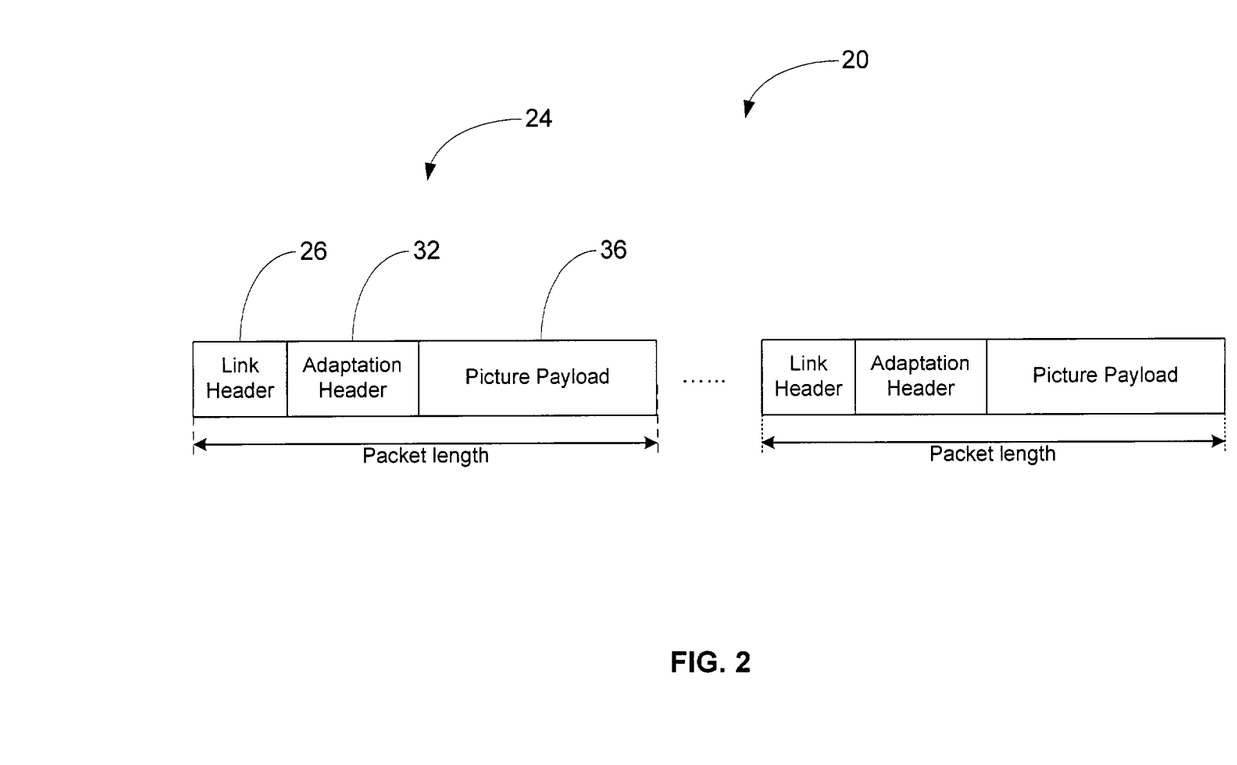
FIG. 2 shows an embodiment of a system stream according to the present invention.

FIG. 2 shows an embodiment of a system stream carrying coded video according to the present invention. The system stream 20 may include one or more packets 24. FIG. 2 illustrates two packets which are not necessarily adjacent packets in presentation or decoding order. The packet 24 may include, for example, a link header 26, an adaptation header 32 and a picture payload 36. The adaptation header may include information, for example, relating to one or more of the following: a presentation time, a decoding time, a differential presentation time, a differential decoding time, other types of time stamps or other types of differential time stamps. The adaptation header need not be present in every packet 24. Furthermore, even if the adaptation header 32 is present in a particular packet 24, the adaptation header need not always include information relating to any or all of the above-listed times or differential times.

In one embodiment, some packets 24, which include picture payloads 36 including information relating to intra-coded pictures, may include adaptation headers 32 that may include, for example, information relating to absolute or non-differential time values. The use of absolute values may be beneficial for purposes such as, for example, random access, fast forward, rewind playback, record and error-resilience. Some packets 24, which include payloads 36 including information relating to inter-coded pictures, may include adaptation headers 32 that may include, for example, information relating to inter-picture or differential time values.

In another embodiment, the picture payload 36 of the first packet may include, for example, an I-picture payload and the picture payload 36 of a later (although not necessarily adjacent) packet may include, for example, a P-picture payload or a B-picture payload. The adaptation header 32 of the first packet may include, for example, information relating to an absolute decoder time or to an absolute presentation time and the adaptation header 32 of the later packet may include, for example, information relating to a differential decoding time or to a differential presentation time.

In one embodiment, if a decoder encounters a picture without a non-differential decoding or a non-differential presentation time coded in the stream, then the decoder may determine the respective decoding time or the respective presentation time for the picture based upon, for example, a decoding time or a presentation time of a previous picture (e.g., a previous frame picture or a previous field picture). Further information about the respective decoding time or the respective presentation time may be ascertained, for example, from an encoded differential decoding time or an encoded differential display time of an intervening picture or a current picture and from information about picture structure (e.g., field or frame).

Figure 3:
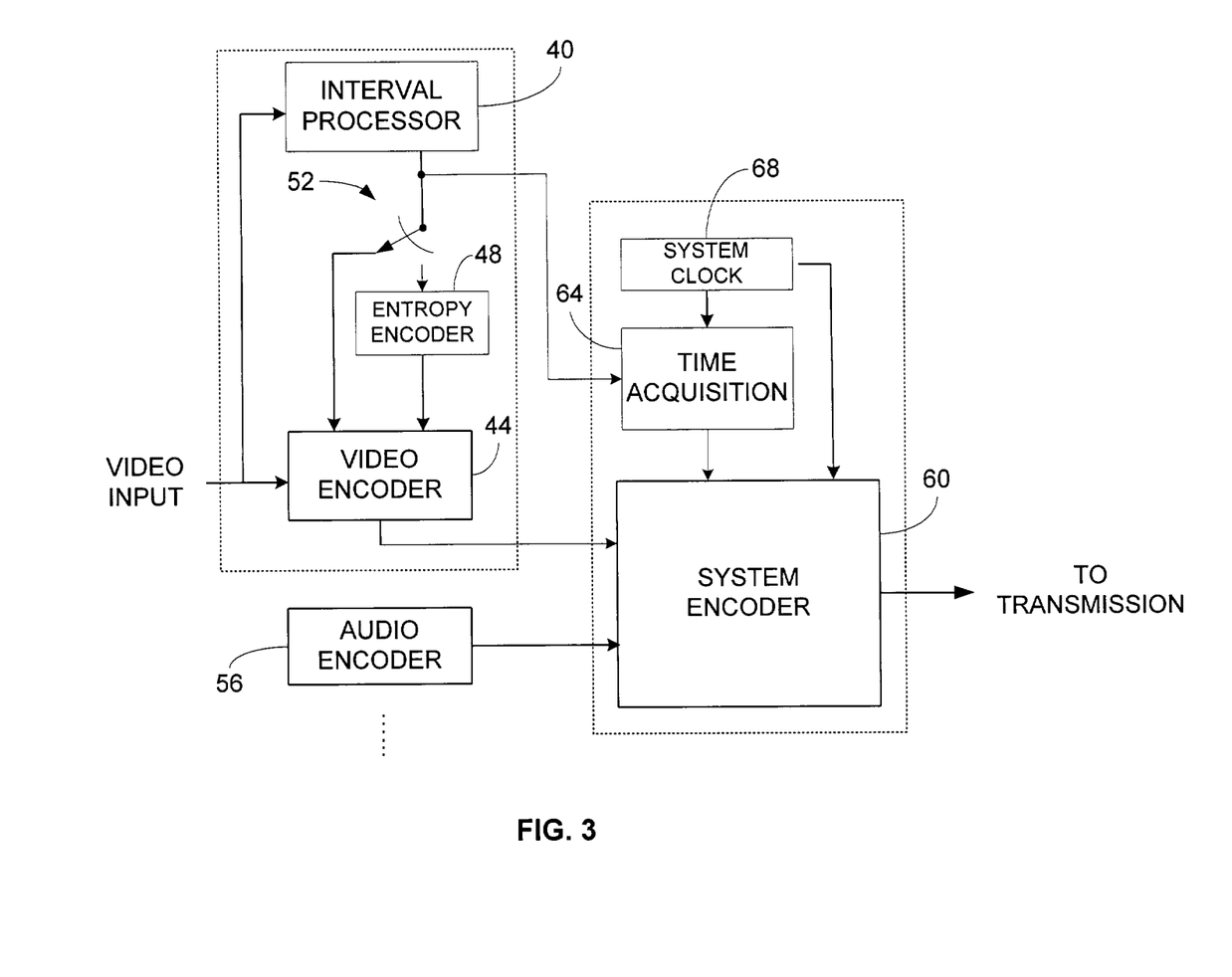
FIG. 3 shows an embodiment of an encoding system according to the present invention.

FIG. 3 shows an embodiment of an encoder system according to the present invention. Video is received by the encoder system and is processed by the interval processor 40 and the video encoder 44. The interval processor 40 determines, for example, the inter-picture display intervals and decoding intervals from the video. The inter-picture display intervals and the decoding intervals are optionally entropy encoded (e.g., variable length coding or fixed length coding) via the entropy encoder 48. Whether entropy encoding occurs depends upon the position of a switch 52. Depending upon the position of the switch 52, the output of the interval processor 40 or the output of the entropy encoder 48 is received by the video encoder 44 and encoded into the video. Encoded video and encoded audio are sent from the video encoder and an audio encoder 56 to a system encoder 60. The inter-picture display intervals and the decoding intervals are sent from the interval processor 40 to the time acquisition block 64. The time acquisition block 64 acquires the decoding time and the presentation time using the inter-picture display intervals and the decoding intervals and the system clock signal provided by the system clock 68. The system encoder 60 then encodes the video and the audio with information including, for example, one or more of the following: differential decoding times, differential presentation times, non-differential decoding times, non-differential presentation times or other timing or differential timing information. The video stream including the audio stream is then transmitted over a network (not shown) as a video bitstream.

Figure 4:
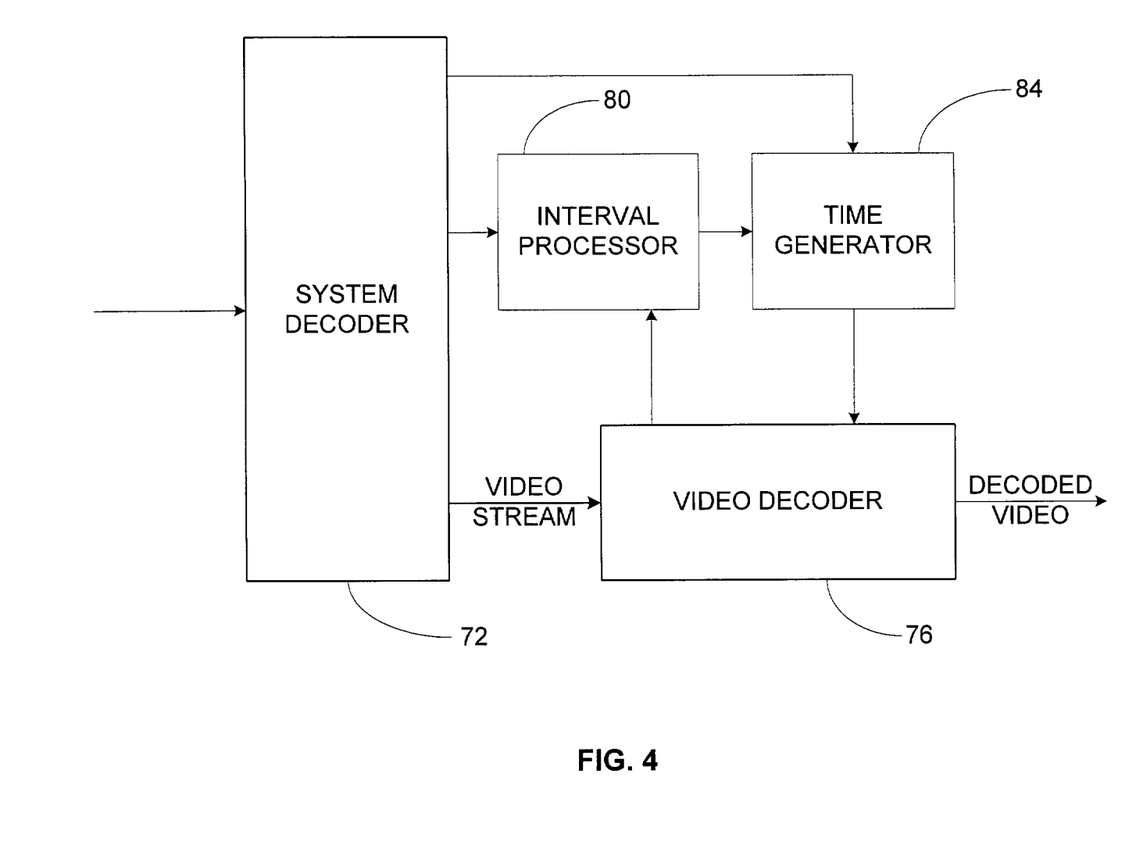
FIG. 4 shows an embodiment of a decoder system according to the present invention.

FIG. 4 shows an embodiment of a decoder system according to the present invention. A system decoder 72 receives the video bitstream via the network. The system decoder 72 demuxes or parses the video bitstream. The video stream is sent to a video decoder 76. A portion of the video bitstream relating to the inter-picture display intervals and the decoding intervals are sent to an interval processor 80. In one embodiment, the portion of the video bitstream parsed out for delivery to the interval processor 80 includes, for example, the adaptation header 32. The interval processor 80 can extract the inter-picture display intervals and the decoding intervals from the parsed video bitstream. Where the differential time values are not stored in system encoding, the interval processor 80 may have to extract the differential time values from the video stream. In one embodiment, differential values can be extracted from the system layer or the video layer depending upon where the differential values are encoded. Accordingly, the video stream may also be provided by the video decoder 76 to the interval processor 80. Once extracted, the inter-picture display intervals and the decoding intervals are sent to the time generator 84. The time generator 84 can generate decoding times and presentation times which are then sent to the video decoder 76. The video decoder 76 decodes the video stream according to the received decoding times and presents the decoded video stream according to the received presentation times.

The system decoder 72 also parses out portions of the video bitstream that have been encoded with non-differential time values (e.g., absolute presentation times or absolute decoding times). These portions of the video bitstream are sent directly to the time generator 84. The time generator 84 then generates the decoding times and the presentation times from the received parsed video bitstream and sends the information to the video decoder 76. The video decoder 76 decodes the video stream according to the received decoding times and presents the decoded video stream according to the received presentation times.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for facilitating video display, the method comprising:

extracting individual non-differential timing information values from a syntax of intra-coded pictures of a video bitstream which indicate times in which the intra-coded pictures are to be decoded or presented;

extracting individual differential timing information values from a syntax of inter-coded pictures of a video bitstream separate from the non-differential timing information values which indicate times in which the inter-coded pictures are to be decoded or presented, wherein a differential timing information value is one or both of differential decoding time information value and differential presentation time information value with respect to a previous timing information value of the video bitstream;

determining a decoding time or a presentation time of an inter-coded picture based upon an extracted differential timing information value and the previous timing information value of the video bitstream; and utilizing the determined decoding time or presentation time for facilitating the display of the inter-coded picture.

2. The method according to claim 1, further comprising inserting the differential timing information value into the syntax of the inter-coded picture by inserting the differential timing information value into a header of the inter-coded picture.

3. The method according to claim 1, wherein a packet of the video bitstream comprises a picture payload.

4. The method according to claim 3, wherein the picture payload comprises at least one of an intra-coded picture payload and an inter-coded picture payload.

5. The method according to claim 3, wherein the picture payload comprises at least one of an I-picture payload, a P-picture payload and a B-picture payload.

6. The method according to claim 1, wherein the differential decoding time information value comprises information of a difference between a first decoding time instant and a second decoding time instant, wherein the first decoding time instant is associated with a first picture of the video bitstream, and wherein the second decoding time instant is associated with a second picture of the video bitstream.

7. The method according to claim 6, wherein the first picture comprises at least one of a first field picture and a first frame picture, and wherein the second picture comprises at least one of a second field picture and a second frame picture.

8. The method according to claim 1, wherein the differential presentation time information value comprises information of a difference between a first presentation time instant and a second presentation time instant, wherein the first presentation time instant is associated with a first picture of the video bitstream, and wherein the second presentation time instant is associated with a second picture of the video bitstream.

9. The method according to claim 8, wherein the first picture comprises at least one of a first field picture and a first frame picture, and wherein the second picture comprises at least one of a second field picture and a second frame picture.

10. The method according to claim 1, further comprising:

applying entropy coding with respect to the differential decoding time information value or the differential presentation time information value.

11. The method according to claim 10, wherein applying entropy coding comprises applying a Universal Variable Length Code (UVLC).

12. A method for communicating video timing information, the method comprising:

determining a first timing information value which indicates a time in which an inter-coded picture is to be decoded or presented, wherein the first timing information value is one or both of a differential decoding time information value or a differential presentation time information value;

embedding the determined first timing information value into a first packet of the inter-coded picture of a video bitstream; and embedding a second timing information value into a second packet of an intra-coded picture of the video bitstream which indicates a time in which the intra-coded picture is to be decoded or presented, the second timing information comprising one or both of non-differential decoding time information value or a non-differential presentation time information value.

13. The method according to claim 12, wherein the differential decoding time information value comprises a difference between a decoding time of the first packet and a decoding time of the second packet.

14. The method according to claim 12, wherein the differential presentation time information value comprises a difference between a presentation time of the first packet and a presentation time of the second packet.

15. The method according to claim 12, further comprising:

determining a decoding time or a presentation time of the first packet based upon the first timing information value and the second timing information value.

16. The method according to claim 12, wherein the second packet comprises an intra-coded picture payload.

17. The method according to claim 16, wherein the intra-coded picture payload comprises an I-picture payload.

18. The method according to claim 12, wherein the first packet comprises an inter-coded picture payload.

19. The method according to claim 18, wherein the inter-coded picture payload comprises at least one of a P-picture payload or a B-picture payload.

20. The method according to claim 12, further comprising:

determining a presentation time or a decoding time of the first packet based upon information comprising information relating to picture structure.

21. The method according to claim 12, further comprising:

applying entropy coding with respect to the differential decoding time information or the differential presentation time information.

22. The method according to claim 21, wherein applying entropy coding comprises applying a Universal Variable Length Code (UVLC).

23. A system for communicating video information, the system comprising:

an encoder system adapted to encode one or more packets of intra-coded pictures of a video bitstream with one or more non-differential timing information values which indicate one or more times in which the intra-coded picture are to be decoded or presented;

the encoder system further adapted to encode one or more packets of inter-coded pictures of the video bitstream with one or more differential timing information values separate from the non-differential timing information values which indicate one or more times in which the inter-coded picture are to be decoded or presented, wherein a differential timing information value is one or both of a differential decoding time information value and a differential presentation time information value with respect to a previous non-differential timing information value of the video bitstream.

24. The system according to claim 23, wherein the encoder system comprises an entropy encoder.

25. The system according to claim 24, wherein the entropy encoder is adapted to apply entropy coding with respect to the differential decoding time information value or the differential presentation time information value.

26. The system according to claim 23, further comprising: a decoder system coupled to the encoder system via a network, the decoder system adapted to determine a decoding time or a presentation time of an inter-coded picture of the video bitstream based upon the differential timing information value.

27. A video encoder comprising at least one circuit that operates to, at least:
receive video information representing a sequence of pictures;
determine a non-differential presentation time information value for a first picture of the sequence of pictures;
determine a differential presentation time information value for a second picture of the sequence of pictures, where the differential presentation time information value is relative to the non-differential presentation time information value;
encode the sequence of pictures, wherein the first picture is encoded as an intra-coded picture and the second picture is encoded is an inter-coded picture; and
output a video bitstream comprising:
the encoded sequence of pictures comprising the intra-coded first picture and the inter-coded second picture;
the non-differential presentation time information value of the intra-coded first picture which indicates a time in which the intra-coded picture is to be decoded or presented; and
the differential presentation time information value of the inter-coded second picture separate from the non-differential presentation time information value which indicates a time in which the inter-coded picture is to be decoded or presented.

28. The video encoder of claim 27, wherein the at least one circuit further operates to, at least, entropy encode the determined differential presentation time information value.

29. The video encoder of claim 28, wherein the at least one circuit operates to entropy encode the determined differential presentation time information value separately from encoding the sequence of pictures.

30. A video encoder comprising at least one circuit that operates to, at least:
receive video information representing a sequence of pictures;
determine non-differential decoding time information value for a first picture of the sequence of pictures;
determine differential decoding time information value for a second picture of the sequence of pictures, where the differential decoding time information value is relative to the non-differential decoding time information value;
encode the sequence of pictures, wherein the first picture is encoded as an intra-coded picture and the second picture is encoded is an inter-coded picture; and
output a video bitstream comprising:
the encoded sequence of pictures comprising the intra-coded first picture and the inter-coded second picture;
the non-differential decoding time information value of the intra-coded first picture which indicates a time in which the intra-coded picture is to be decoded or presented; and
the differential decoding time information value of the inter-coded second picture separate from the non-differential decoding time information value which indicates a time in which the inter-coded picture is to be decoded or presented.

31. The video encoder of claim 30, wherein the at least one circuit operates to entropy encode the determined differential decoding time information value.

32. The video encoder of claim 31, wherein the at least one circuit operates to entropy encode the determined differential decoding time information value separately from encoding the sequence of pictures.

33. The method according to claim 1, wherein the differential decoding time information value of a picture is the difference between a decoding time of the picture and a decoding time of an adjacent picture in coded data order.

34. The method according to claim 1, wherein the differential presentation time information value of a picture is the difference between a presentation time of the picture and a presentation time of an adjacent picture in display order.

35. The method according to claim 12, further comprising transmitting the video bitstream over a network.

* * * * *